US012657112B2

(12) United States Patent
Padma et al.

(10) Patent No.: US 12,657,112 B2
(45) Date of Patent: Jun. 16, 2026

(54) INTEGRATED SYSTEM FOR ASSESSING APPLICATION FITNESS

(71) Applicant: STATE STREET BANK AND TRUST COMPANY, Boston, MA (US)

(72) Inventors: Ravindra Pundlik Padma, Glen Mills, PA (US); Baljit Chudha, Boston, MA (US); Mihai Popa, Boston, MA (US)

(73) Assignee: STATE STREET BANK AND TRUST COMPANY, Boston, MA (US)

( * ) Notice: Subject to any disclaimer, the term of this patent is extended or adjusted under 35 U.S.C. 154(b) by 66 days.

(21) Appl. No.: 18/131,200

(22) Filed: Apr. 5, 2023

(65) Prior Publication Data

US 2024/0338294 A1     Oct. 10, 2024

(51) Int. Cl.
G06F 11/3604       (2025.01)
G06F 8/77       (2018.01)

(52) U.S. Cl.
CPC ............ G06F 11/3616 (2013.01); G06F 8/77 (2013.01); G06F 11/3608 (2013.01)

(58) Field of Classification Search
CPC ..... G06F 11/3616; G06F 11/3608; G06F 8/77
See application file for complete search history.

(56) References Cited

U.S. PATENT DOCUMENTS 10,713,570 B1 * 7/2020 Hazard ...................... G06F 8/77
2006/0167939 A1 * 7/2006 Seidman ............. G06F 11/3616

2008/0320457 A1 * 12/2008 King ................... G06F 11/3616
717/146
2012/0017195 A1 * 1/2012 Kaulgud ............. G06F 11/3692
717/101
2017/0235662 A1 * 8/2017 Leask ................. G06F 11/3616
717/126
2018/0143891 A1 * 5/2018 Polisetty ............. G06F 11/3616
2019/0026108 A1 * 1/2019 Byrd ......................... G06F 8/75
2020/0218533 A1 * 7/2020 Sharma ............... G06F 11/3636
2023/0138072 A1 * 5/2023 Chonkar ............. G06F 11/1433
714/15

* cited by examiner

*Primary Examiner* — Ei Y Mui
*Assistant Examiner* — Brahim Bourzik
(74) *Attorney, Agent, or Firm* — GOODWIN PROCTER LLP

(57)          ABSTRACT
Exemplary embodiments may provide an integrated system for assessing application fitness. The integrated system may provide a complete and accurate picture of the fitness of all or a portion of the applications used by an organization. The integrated system may ingest information about the applications from multiple sources and may assess the fitness of the application in multiple aspects. Metric scores for the fitness of each application may be generated and displayed on a user interface, such as on dashboards. The metric scores may reflect various aspects of the fitness of the applications. For example, in some exemplary embodiments, the metric scores may reflect software development life cycle (SDLC) standards, non-functional requirements (NFR) standards, and/or application stability standards. In addition, the exemplary embodiments may determine an overall fitness metric score for each of the applications. Visualizations of the metrics may be displayed on user interfaces, such as on the dashboards.

12 Claims, 12 Drawing Sheets

300

400

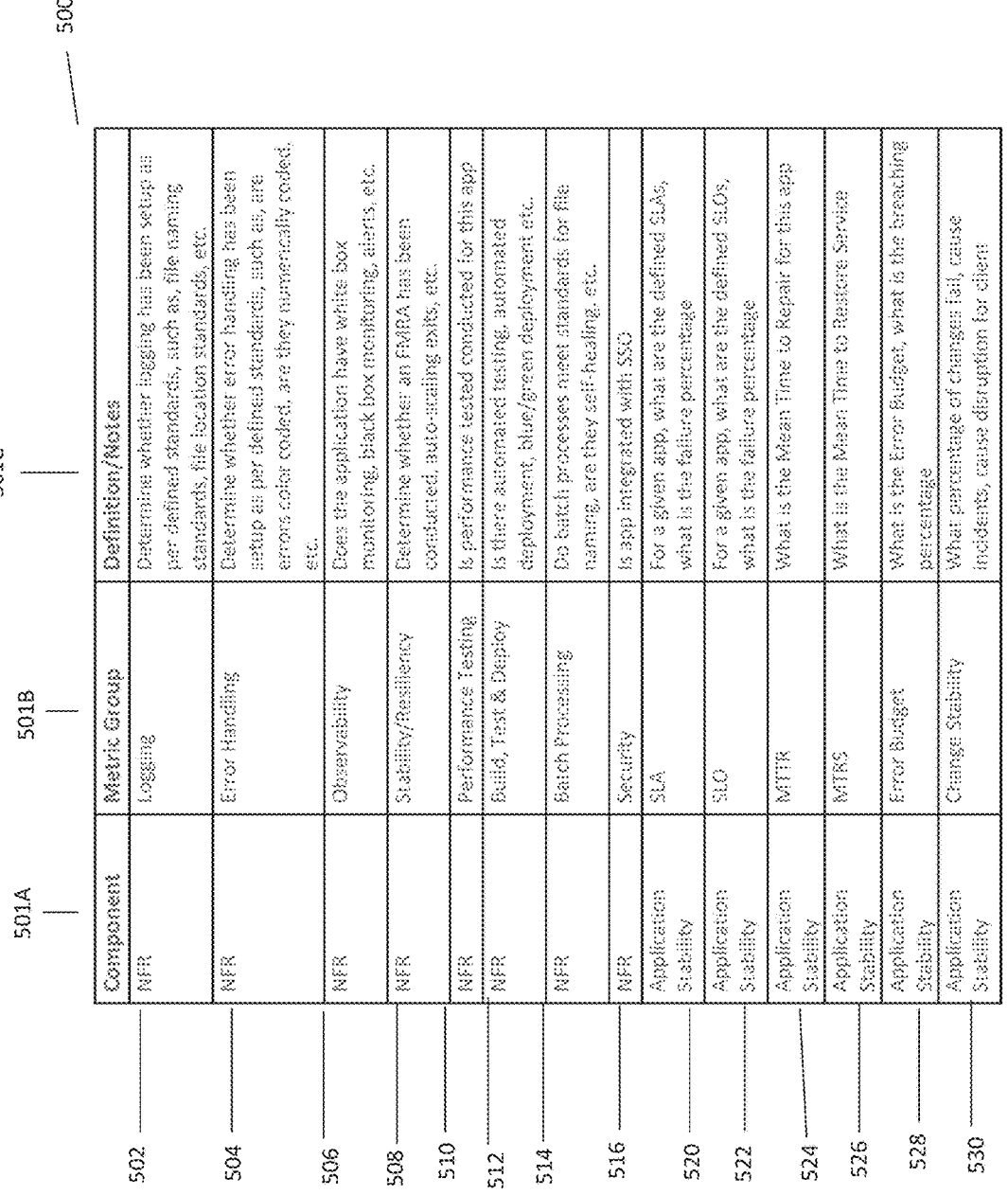

| Component | Metric Group | Definition/Notes |
|---|---|---|
| NFR | Logging | Determine whether logging has been setup as per defined standards, such as, file naming standards, file location standards, etc. |
| NFR | Error Handling | Determine whether error handling has been setup as per defined standards, such as, are errors color coded, are they numerically coded, etc. |
| NFR | Observability | Does the application have white box monitoring, black box monitoring, alerts, etc. |
| NFR | Stability/Resiliency | Determine whether an FMRA has been conducted, auto-scaling exits, etc. |
| NFR | Performance Testing | Is performance tested conducted for this app |
| NFR | Build, Test & Deploy | Is there automated testing, automated deployment, blue/green deployment etc. |
| NFR | Batch Processing | Do batch processes meet standards for file naming, are they self-healing, etc. |
| NFR | Security | Is app integrated with SSO |
| Application Stability | SLA | For a given app, what are the defined SLAs, what is the failure percentage |
| Application Stability | SLO | For a given app, what are the defined SLOs, what is the failure percentage |
| Application Stability | MTTR | What is the Mean Time to Repair for this app |
| Application Stability | MTRS | What is the Mean Time to Restore Service |
| Application Stability | Error Budget | What is the Error Budget, what is the breaching percentage |
| Application Stability | Change Stability | What percentage of changes fail, cause incidents, cause disruption for client |

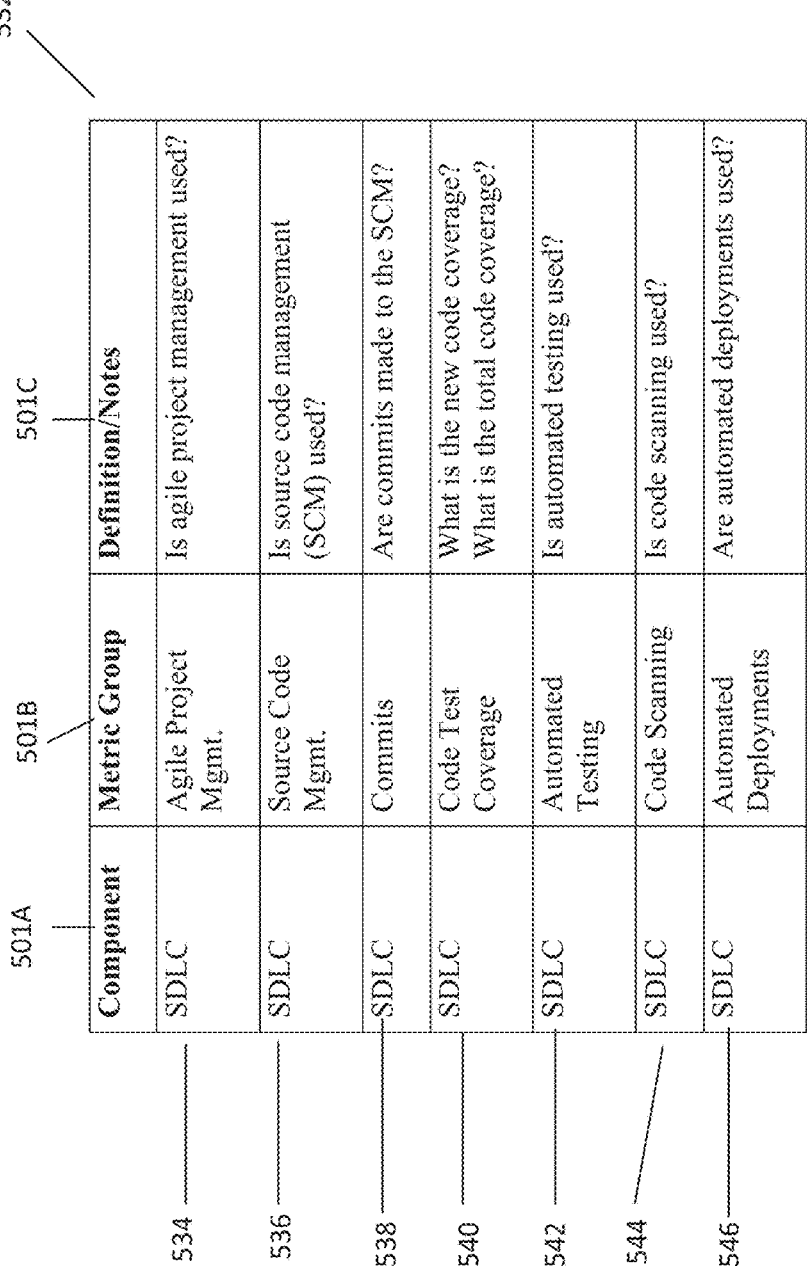

| Component | Metric Group | Definition/Notes |
|---|---|---|
| SDLC | Agile Project Mgmt. | Is agile project management used? |
| SDLC | Source Code Mgmt. | Is source code management (SCM) used? |
| SDLC | Commits | Are commits made to the SCM? |
| SDLC | Code Test Coverage | What is the new code coverage? What is the total code coverage? |
| SDLC | Automated Testing | Is automated testing used? |
| SDLC | Code Scanning | Is code scanning used? |
| SDLC | Automated Deployments | Are automated deployments used? |

Processor(s) 832

Network Adapter 834

ETL Engine 842

Fitness Engine 844

Input Devices 836

Storage 840

UI/Dashboards 846

Output Devices 838

INTEGRATED SYSTEM FOR ASSESSING APPLICATION FITNESS

BACKGROUND

Most organizations use a number of software applications that may be distributed across multiple platforms at different locations. Typically, an organization deploys a myriad of tools to monitor their applications to monitor the fitness of the applications and attempt to identify possible issues with the applications before such issues arise. The tools are not integrated and provide an isolated view of an aspect of one or more applications. In addition, the tools do not provide a standard for assessing the overall fitness of the applications. The net result is that organizations do not get a complete and accurate picture of the fitness of the applications in their organizations.

SUMMARY

In accordance with an inventive facet, a method is performed by a processor of computing device. The method includes accessing information regarding fitness of applications that are available in an organization with the processor. The method further includes, based on the accessed information, with the processor, calculating an application stability metric score for each of selected ones of the applications, a software development life cycle (SDLC) maturity metric score for each of the selected ones of the applications, and a non-functional requirements (NFR) maturity metric score for each of the selected ones of the applications. The method additionally includes displaying an indication of the application stability metric score, the SDLC maturity metric score, and the NFR maturity metric score for the selected ones of the applications as part of a user interface on a display device.

The method may include calculating an aggregate fitness score from the application stability metric score, the SDLC maturity metric score and the NFR maturity metric score for each of the selected ones of the applications. The method may additionally include displaying the aggregate fitness scores as part of the user interface. The method may include binning the at least some of the scores into bins, wherein each bin is associated with a range of the scores. Each of the bins may be associated with a degree of fitness. The method may include displaying a user interface for specifying what applications are included in the selected ones of the applications. The selected ones of the applications may be applications for a business unit of a business entity, a division of a business entity, or a department of a business entity.

Computer programming instructions for causing a processor to perform the method may be stored on a non-transitory computer-readable storage medium.

In accordance with another inventive facet, a computing device includes a non-transitory computer-readable storage medium storing computer programming instructions and a processor configured to execute the computer programming instructions. Executing the computer programming instructions causes the processor to access information regarding fitness of applications that are available in an organization with a processor. The computer programming instructions further cause the processor to, based on the accessed information, calculate an application stability metric score for each of selected ones of the applications, a SDLC maturity metric score for each of the selected ones of the applications, and a NFR maturity metric score for each of the selected ones of the applications. Executing the computer programming instructions further causes the processor to display an indication of the application stability metric score, the SDLC maturity metric score, and the NFR maturity metric score for the selected ones of the applications as part of a user interface on a display device.

The computer programming instructions may further cause the processor to calculate an aggregate fitness score from the application stability metric score, the SDLC maturity metric score and the NFR maturity metric score for each of the selected ones of the applications. The computer programming instructions may further cause the processor to display the aggregate fitness scores as part of the user interface. The computer programming instructions may further cause the processor to bin the at least some of the scores into bins, wherein each bin is associated with a range of the scores. Each of the bins may be associated with a degree of fitness. The computer programming instructions may further cause the processor to display a user interface for specifying what applications are included in the selected ones of the applications.

BRIEF DESCRIPTION OF THE DRAWINGS

FIGS. 5A and 5B depict tables of illustrative fitness metrics for an application that may be used in exemplary embodiments.

DETAILED DESCRIPTION

Exemplary embodiments may provide an integrated system for assessing application fitness. The integrated system may provide a complete and accurate picture of the fitness of all or a portion of the applications used by an organization. The integrated system may ingest information about the applications from multiple sources and may assess the fitness of the application in multiple aspects. Metric scores for the fitness of each application may be generated and displayed on a user interface, such as on dashboards. The metric scores may reflect various aspects of the fitness of the applications. For example, in some exemplary embodiments, the metric scores may reflect software development life cycle (SDLC) standards, non-functional requirements (NFR) standards, and/or application stability standards. In addition, the exemplary embodiments may determine an overall fitness metric score for each of the applications. Visualizations of the metrics may be displayed on user interfaces, such as on the dashboards.

The exemplary embodiments may provide a more complete picture of application fitness than conventional approaches. As mentioned above, the exemplary embodiments may characterize many different facets of the fitness of applications, but in addition, the exemplary embodiments may also provide an overall fitness metric score for an application based on the measured facets of fitness. The exemplary embodiments may provide fitness information for multiple varieties of types of applications in an organization, such as a corporation, business unit, department or the like. The integrated system of the exemplary embodiments may act as a singular landing place for obtaining fitness information about applications throughout an organization.

"Application" is used herein to refer to a program, module, library, method, or other logical grouping of software (i.e., computer programming instructions) that is named and that may be executed on a processor.

Figure 1:
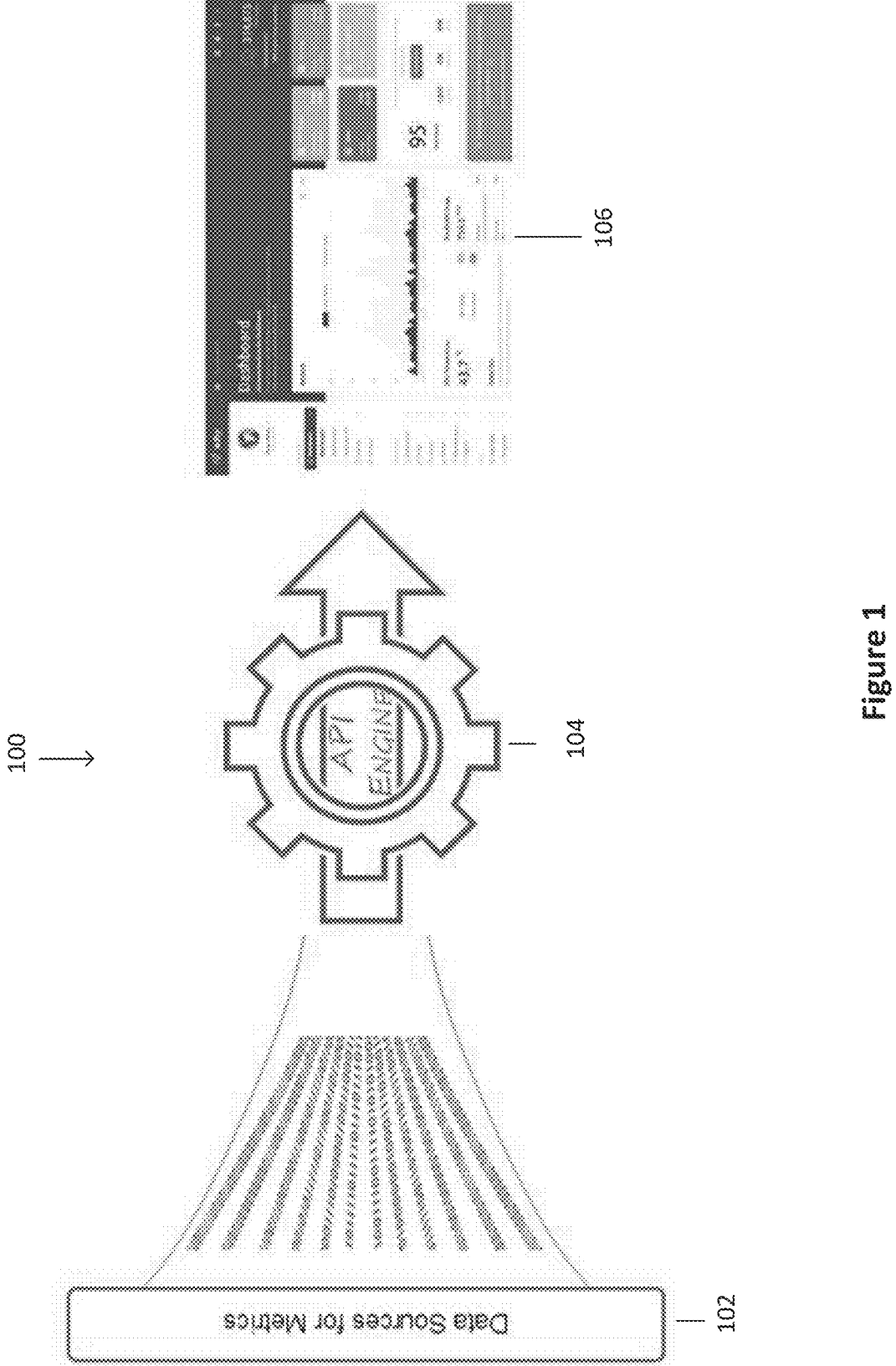
FIG. 1 depicts an illustrative data flow in exemplary embodiments.

FIG. 1 depicts an illustration of data flow in exemplary embodiments to generate a user interface 106, like a dashboard, showing fitness metric scores for one or more applications. Data regarding the one or more applications originates from data sources 102, such as application logs, network monitoring software, application monitoring software or the like. In the exemplary embodiments, the data sources 102 for determining fitness metrics are for the applications that are being measured for fitness. The data may be obtained from the data sources 102, transformed into metric data and loaded into a storage, such as a database. When a user wishes to view a user interface 106, like a dashboard, a fitness engine 104 may invoke one or more application program interfaces (API's) to retrieve the fitness metric data from the database or storage and populate the dashboard with the fitness metric information, as is described in more detail below. A user may then review the fitness metric information, such as fitness metric scores, shown on the user interface 106 to understand the current fitness of one or more applications. In some embodiments, fitness information for all applications in the organization may be accessible via the user interface 106. All such applications may be measured as to the same metrics in some embodiments.

Figure 2:
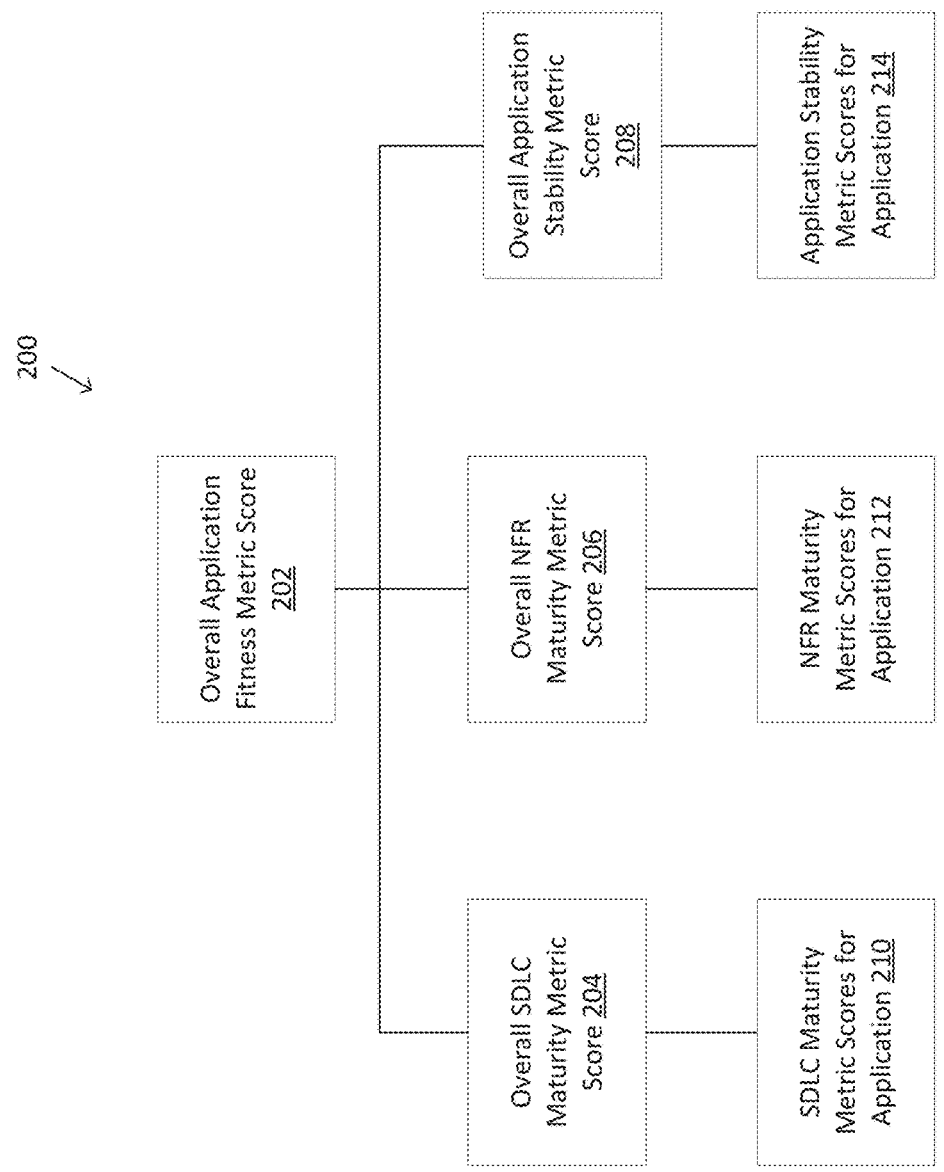
FIG. 2 depicts a diagram of illustrative fitness metric that may be calculated for an application in exemplary embodiments.

FIG. 2 depicts a diagram 200 showing a hierarchy of fitness metric scores that may be determined in exemplary embodiments for an application. An overall fitness metric score 202 may be calculated for an application based on a combination of overall fitness metric scores for different fitness metric categories. For instance, the overall application fitness metric score 202 may be calculated from the overall SDLC maturity metric score 204, the overall NFR maturity metric score 206, and the overall application stability metric score 208. The overall SDLC maturity metric score 204 may be determined from SDLC maturity metric scores 210 for the application. The overall SDLC NFR maturity metric score 206 may be determined from NFR maturity metric scores 212 for the application, and the overall application stability metric score 208 may be determined from the application stability metric scores for the application 214.

Figure 3:
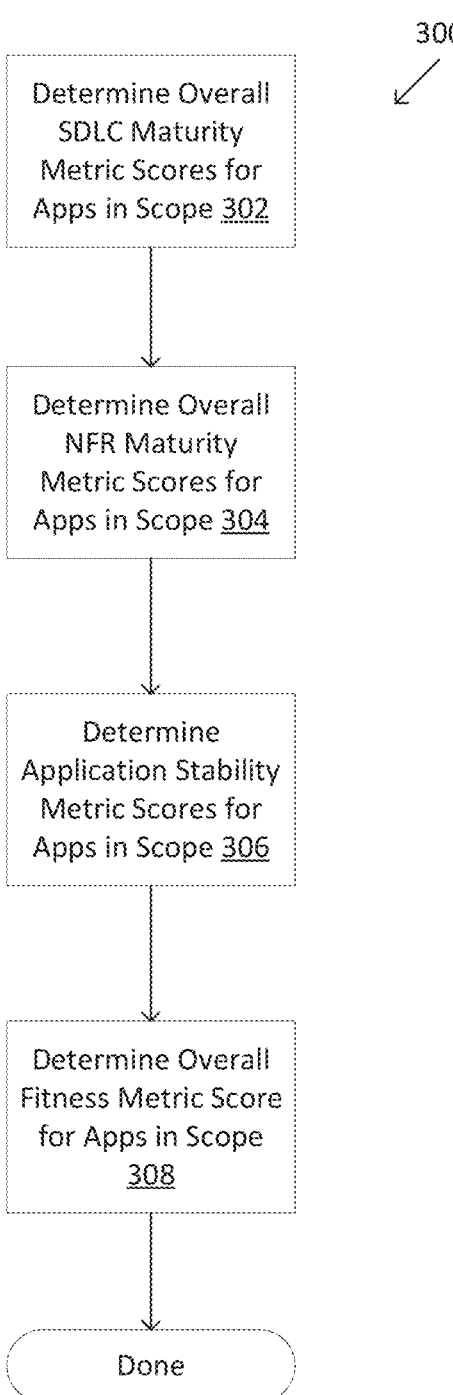
FIG. 3 depicts a flowchart of illustrative steps that may be performed in exemplary embodiments to determine an overall fitness metric score for an application.

FIG. 3 depicts a flowchart 300 of illustrative steps that may be performed in exemplary embodiments to determine the overall fitness scores for applications in a specified scope. The scope may be chosen by the user of the user interface, such as by selecting the scope using user interface options as is described below. The scope may be, for example, all of the applications in an organization, a business unit, a sub-unit of a business unit, or another logical grouping. The organization may be a business entity, such as a corporation, partnership or sole proprietorship. The organization may also be a governmental entity, a non-profit or the like. To determine the overall application fitness metric score for the applications in the scope, the overall SDLC maturity metric scores are determined for the applications in the scope at 302. The overall NFR maturity metric scores for the applications is determined at 304, and the overall application stability metric scores for the applications are determined at 306. The overall fitness metric scores are determined for each application from the overall SDLC maturity metric score, overall NFR maturity metric score and overall application stability metric score at 308. For example, the overall SDLC maturity metric score for an application, the overall NFR maturity metric score for the application, and the overall application stability metric score for the application may be averaged to produce the overall fitness metric score for the application. As another example, the overall fitness metric score for an application may be calculated as a weighted sum of the overall SDLC maturity metric score for an application, the overall NFR maturity metric score for the application, and the overall application stability metric score for the application.

Figure 4:
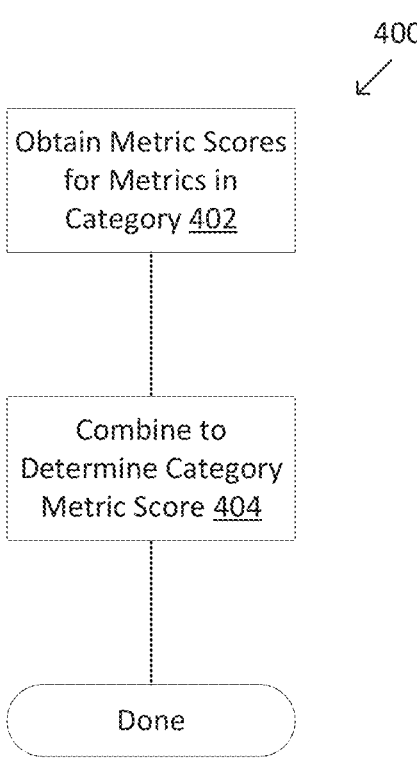
FIG. 4 depicts a flowchart of illustrative steps that may be performed in exemplary embodiments to determine a category metric score for an application.

The overall SDLC maturity metric score for an application, the overall NFR maturity metric score for the application, and the overall application stability metric score may each be derived from fitness metric scores in the associated category. FIG. 4 depicts a flowchart 400 of illustrative steps that may be performed in exemplary embodiments to calculate such overall scores. First, metric scores are obtained for metrics in the specified category at 402. Thus, for the overall SDLC maturity metric score, the fitness metric scores that fall in the SDLC maturity metric scores category for the application are obtained. Similarly, for the overall NFR maturity metric score, the fitness metric scores that fall in the NFR maturity metric scores category for the application are obtained, and for the overall application stability metric score, the fitness metric scores for the application that are for application stability metric category are obtained. Then, the obtained fitness metric scores are combined to produce the overall fitness metric score for the fitness metric category for the application at 404. The combination may be an averaging of the scores or a weighted sum of the scores, for instance. Some scores may be normalized before being averaged or summed in some embodiments.

FIG. 5A depicts a table 500 of illustrative fitness metrics in the NFR fitness metric category and in the application stability metric category that may be determined and displayed for applications in exemplary embodiments. The table 500 has a row for each fitness metric. Column 501A is for specifying what fitness metric category the metric falls into (such as NFR, application stability. Column 501B is for specifying a metric group that the metric falls into and column 501C is for providing a definition and/or notes for the metric. Row 502 concerns an NFR maturity metric that falls into the logging metric group. This metric specifies whether logging has been set up per defined standards, like file naming standards, file location standards, etc. This metric is a binary value, like "yes" or "no." Row 504 concerns an NFR maturity metric that is in the error handling metric group. This metric determines whether error handling has been set up defined standards, such as are errors color coded, numerically coded, etc. Row 506 concerns an NFR maturity metric that is in the observability metric group. The metric indicates whether the application has white box monitoring, black box monitoring, etc.

Row 508 concerns an NFR maturity metric that is in the stability/resiliency metric group. This metric indicates whether a failure mode and reliability analysis (FMRA) has been conducted, auto-scaling exists, etc. Row 510 concerns an NFR maturity metric that is in the performance testing metric group. This metric indicates whether performance testing has been performed on the associated application. Row 512 concerns an NFR maturity metric in the build, test, and deploy metric group. This metric indicates if there is automated testing of the application, whether there is automated deployment of the application, whether there is blue/green deployment, etc. Row 514 concerns an NFR maturity metric in the batch processing metric group, This metric indicates whether batch processes in the application meet naming standards for files and indicates if the batch processes are self-healing, etc. Row 516 concerns an NFR maturity metric that is in the security metric group. This metric indicates whether the associated application is integrated with single sign on (SSO).

Row 520 concerns an application stability metric that is part of a service level agreement (SLA) metric group. This metric indicates what are the defined SLA's for the application and what the failure percentages for the SLA's are. Row 522 concerns and application stability metric that is in a service level objective (SLO) metric group. This metric indicates what SLO's are there for the associated application and what are the failure percentages for the SLO's. Row 524 concerns an application stability metric in the mean time to repair (MTTR) metric group. This metric specifies the MTTR for the associated application. Row 526 concerns an application stability metric that is in a mean time to restore service (MTRS) metric grouping. This fitness metric identified the MTRS for the application. Row 528 concerns an application stability metric that is in the error budget metric group. This fitness metric specifies the error budget and specifies the breaching percentage. Row 530 concerns an application stability metric that is in the change stability metric group. This metric indicates what percentage of changes fail, cause incidents, or cause disruption.

The fitness metrics may also be SDLC maturity metrics. FIG. 5B depicts a table 532 of illustrative fitness metrics that are SDLC maturity metrics. Table 532 is organized like table 500 of FIG. 5A in that each row is associated with a fitness metric and includes columns 501A, 501B, and 501C. Row 534 concerns a fitness metric in the agile project management metric group that indicates whether or not agile project management is used. Row 536 concerns a fitness metric in the source code management metric group that indicates whether source code management (SCM) is used. Row 538 concerns a fitness metric in the commits metric group that indicates whether commits to the SCM are made or not. Row 540 concerns a fitness metric in the code test coverage metric group that indicates the new code test coverage amount and the total code coverage amount. Row 542 concerns a fitness metric in the automated testing metric group that indicates whether automated testing is used. Row 544 concerns a fitness metric in the code scanning metric group that indicates if code scanning is used. Row 546 concerns a fitness metric in the automated deployments metric group that indicates whether automated deployments are used.

It should be appreciated that the fitness metrics listed in FIGS. 5A and 5B are intended to be merely illustrative. Different fitness metrics may be used, only a subset of those listed may be used, or some of the listed fitness metric may be used in conjunction with other fitness metrics. The exemplary embodiments may use these fitness metrics to calculate overall fitness metric scores for the categories (e.g., overall SDLC maturity metric score, overall NFR maturity metric score, and overall application stability metric score) for each application. A formula or recipe for determining the overall category scores may be defined. As mentioned above, averages and weighted sums are examples of such formulas or recipes. Binary fitness metrics may have a zero score associated with one value and a predefined score (such as a positive integer score or a decimal score) associated with the other value.

Figure 6:
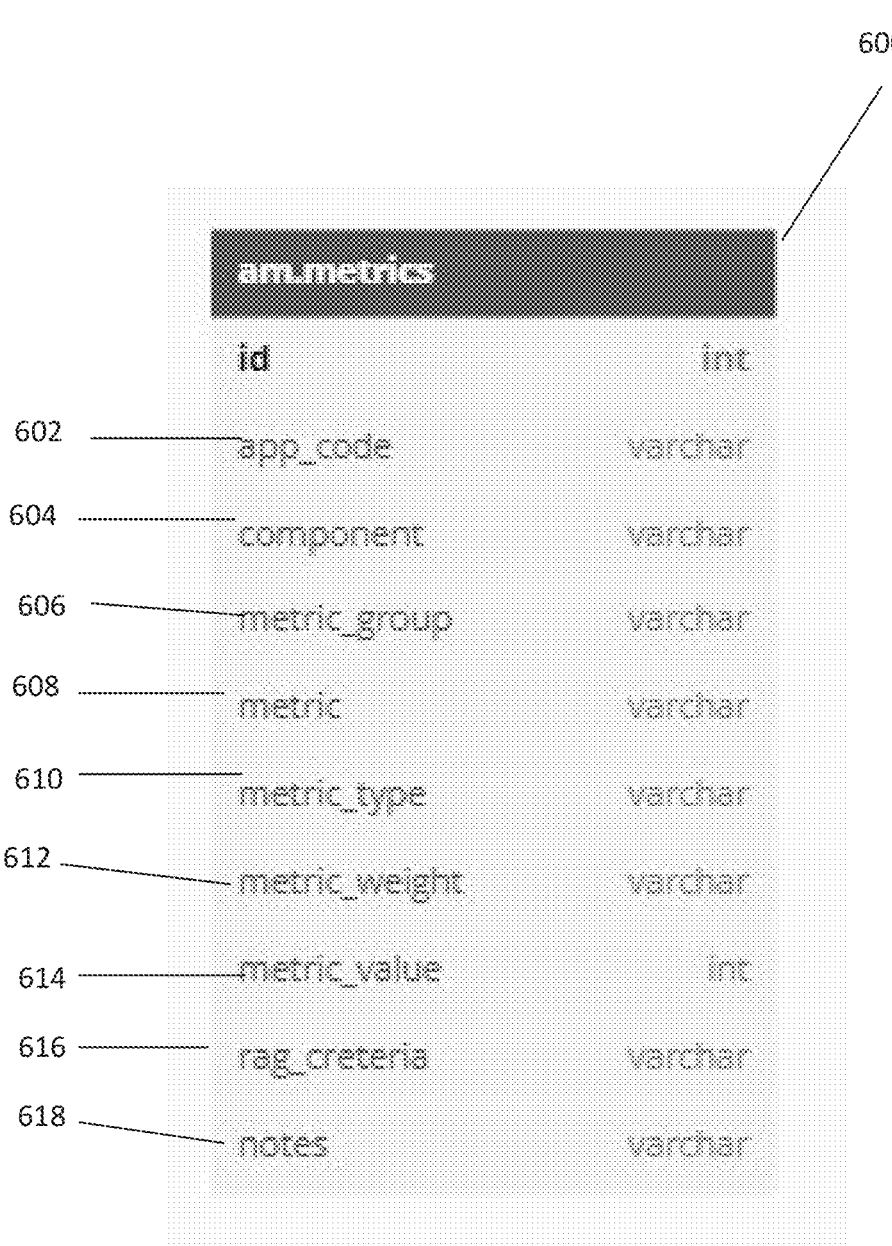
FIG. 6 depicts an illustrative schema for metric information that may be stored in a database in exemplary embodiments.

FIG. 6 depicts an illustrative schema 600 for storing the fitness metric information in storage, such as in a database. For each metric an application code 602 is stored to identify the identify the application to which metric applies. A component field 604 holds the identity of the component to which the metric_group belongs. A component field 604 holds the identity of the component to which the metric-_group belongs. The metric_group field 606 holds the identity of the metric group to which the metric belongs. The metric field 608 holds a name or identifier for the metric. The metric_type field 610 specifies the type of metric (e.g., binary, percentage, value, etc.). The metric_weight field 612 specifies a weight to be given to the metric in calculating the overall fitness category metric. The metric_value specifies the value of the metric. The rag_criteria field 616 is the weight associated with the metric when determining the RAG rating. The rag_criteria field 616 is the weight associated with the metric when determining the RAG rating. The notes field 618 is provided to add notes regarding a metric.

Figure 7:
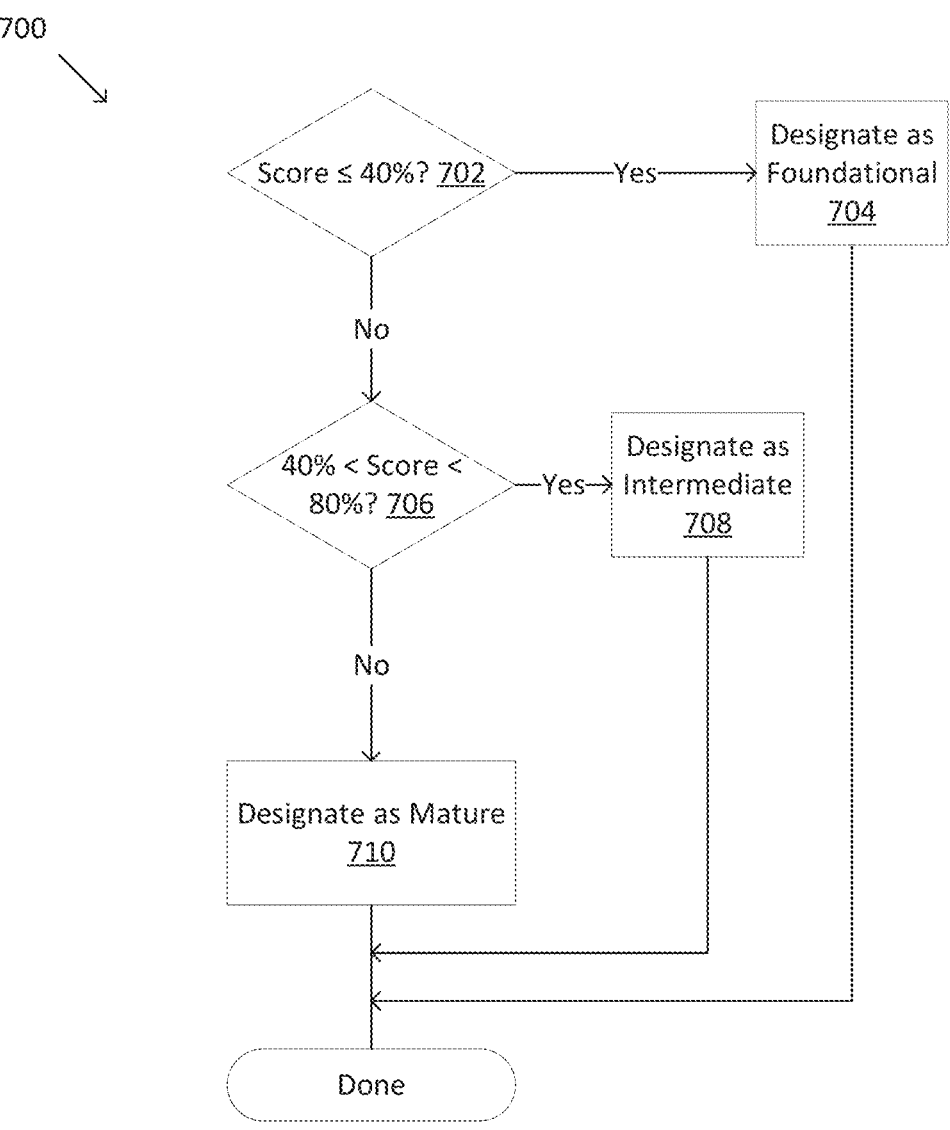
FIG. 7 depicts a flowchart of illustrative steps that may be performed in exemplary embodiments to determine a range that a fitness metric score falls into for binning scores.

Once fitness metric scores have been determined, they may be binned into categories. One approach that may be used in exemplary embodiments is to bin the fitness metrics into three bins: foundational, intermediate, or mature. Foundational is the lowest level of fitness and mature is the highest level of fitness with intermediate being a level of fitness between foundational and mature. The fitness metrics may be binned based on the magnitude of the scores relative to a threshold value. FIG. 7 depicts a flowchart 700 of illustrative steps that may be performed in exemplary embodiments to bin a fitness metric score. At 702, the fitness metric score may be compared to the threshold to determine if the score is less than equal to 40% of the threshold. In such an instance, at 704, the fitness metric score is designated as foundational. If the score is greater than 40% of the threshold, at 706, a check is made whether the score is less than 80% of the threshold value. If so, at 708, the score is designated as intermediate. If not, at 710, the score is designated as mature since the score is greater than 80% of the threshold value.

In some exemplary embodiments, the binning is used to group scores within ranges. Other embodiments may not use such binning. The bins may be indicated on a user interface, such as a dashboard, as will be discussed below. This binning enables a user to quickly understand what areas of fitness are lacking or doing well and how many applications fall into the respective bins for categories of fitness.

Figure 8A:
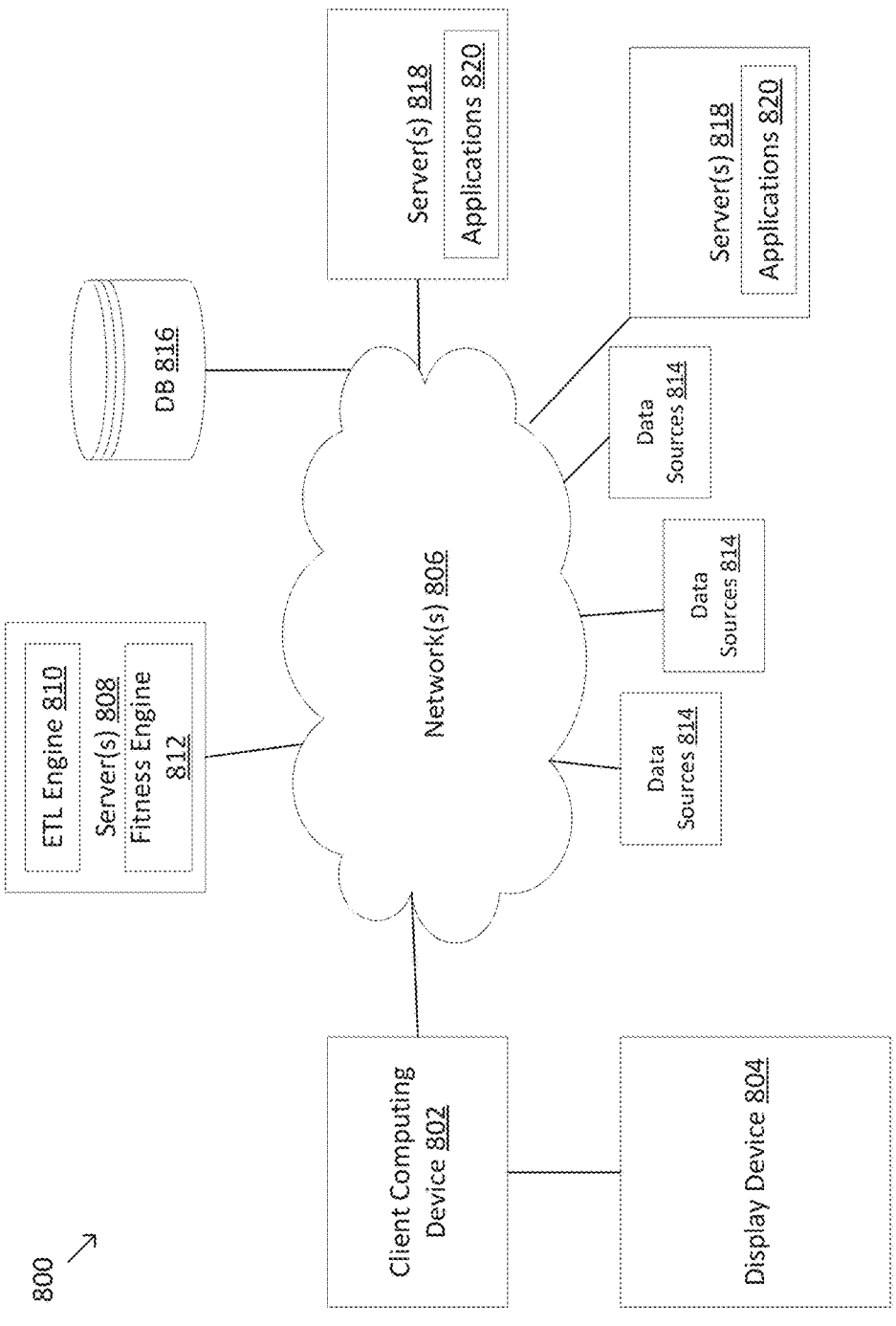
FIG. 8A depicts a block diagram of an illustrative distributed computing environment for exemplary embodiments.
Figure 8B:
FIG. 8B depicts a block diagram of an illustrative server computing device for exemplary embodiments.

FIG. 8A depicts an illustrative distributed computing environment 800 that is suitable for practicing exemplary embodiments. The illustrative distributed computing environment 800 may include a client computing device 802 that is interfaced with one or more networks 806. The client computing device may be a desktop computing device, a workstation, a tablet computing device, a smartphone, or other type of computing device. The network(s) 806 may include one or more local area networks, wide area networks, intranets, the Internet, wireless networks, cellular networks, or other type of networks. The client computing device 802 may include a connected display device 804, such as touchscreen, an LED display, an LCD display, a retinal display or the like for displaying textual, graphical, and vide information. In exemplary embodiments, a user may use the client computing device 802 to gain access to the fitness engine 812. As will be described in more detail below, the fitness engine 812 may be a computer program that may generate a user interface, like a dashboard, to provide fitness metric information regarding applications of an organization, a group or division of the organization, like a business unit, or in a subdivision, like an accounting group. The client computing system may communicate over the network(s) 806 with server(s) 808 where the fitness engine executes. The server(s) 808 may be part of a cluster or cloud in some exemplary embodiments. The server(s) 808 may also run an extract, transform, and load (ETL) engine 810 that may be responsible for extracting data regarding fitness of application, transform the data into fitness metric scores and store the fitness metric scores and other information in a storage, such as database 816. As can be seen, the data used to determine the fitness metric scores may be extracted by the ETL engine 810 from multiple data sources 814 that are accessible via the network(s) 806. The data sources 814 may be logs, databases, or other storages where the data is stored by programs, such as network monitoring programs, application monitoring programs, logging software, etc. The applications 820 may be located throughout the organization, business unit, division, or other logical grouping. In FIG. 8, the applications 820 are shown being resident on server(s) 818 that are connected to the network(s). It should be appreciated that the applications may also be resident on other types of computing devices as well.

Figure 9:
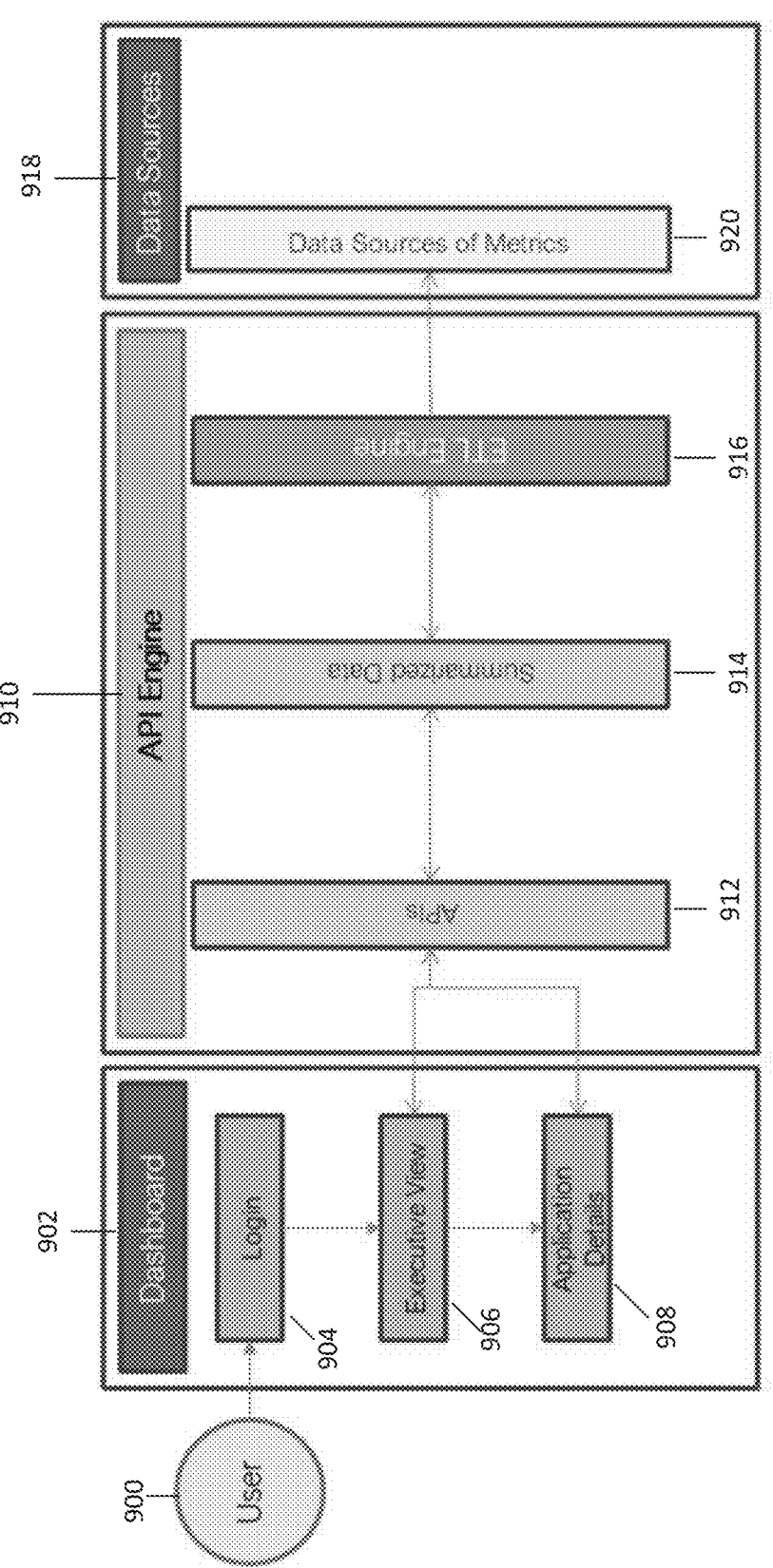
FIG. 9 depicts an illustration of how information for a user interface dashboard is obtained in exemplary embodiments.

FIG. 9 depicts server(s) 808 in more detail. The depiction for FIG. 9 is for the case where the server(s) 808 contain a single server computing device. The server computing device 808 includes one or more processor(s) 832 for executing computer programming instructions. The processor(s) 832 may include a central processing unit (CPU), a graphics processing unit (GPU), an application specific integrated circuit (ASIC), a field programmable gate array (FPGA), or other processing logic. A storage 840 is provided. The storage 840 may include various types of non-transitory computer-readable storage media including types of random access memory (RAM), read only memory (ROM), solid state memory, optical disc storage, magnet disc storage, or other types of storage. In FIG. 8, the storage 840 holds computer programming instructions for the ETL engine 842 and the fitness engine 844. In some embodiments, the fitness engine 844 may be realized as a website having web pages that are accessible by a user over the Internet or an intranet using a web browser. The storage 840 may also hold instructions 846 for generating the user interface (UI), like dashboards. In some embodiments, these instructions may be incorporated directly into the fitness engine 844. The storage may additionally hold other items, such as data, documents, etc. The server computing device

808 may include a network adapter 834 for interfacing with the network(s) 806. The server computing device 808 also may optionally include input devices 836, like a mouse, a thumbpad, a keyboard, and/or output devices 838, like a display device, a printer, or a speaker.

As mentioned above, a user may gain access to a dashboard provided by the fitness engine. FIG. 9 depicts a diagram depicting various components involved in such an interaction. As shown, a user 900 seeks to access the dashboard 902 to review information regarding the fitness of applications. The user 900 gains access to the dashboard, such as via a website for viewing the dashboard. The user 900 may be, for example, a chief technical officer, a chief information officer, a network maintenance engineer, a technology operation engineer, an author of an application, a site reliability engineer, members of a change advisory board, member of an architecture review board, application owners or the like. The user 900 logs in 904, such as by providing a user name and password. The website for the dashboard will verify and validate the user name and password. The user 900 may gain access to an executive view 906 provided by the dashboard. Via the executive view 906, the user 900 may gain access to particular details 908, such as metric fitness scores, regarding the fitness of an application 908.

In response to the user 900 requesting to view the dashboard 902, API's 912 are called. The API's 912 retrieve summarized data 914 for the metrics scores from a database to populate the dashboard 902. The ETL engine 916 may extract the data and update the database at regular intervals, such as every 12 hours or alternately on demand. The ETL engine 916 extracts data from the data sources 920, uses the extracted data to calculate fitness metric scores and stores the fitness metric information, including the scores, in the database.

Figure 10:
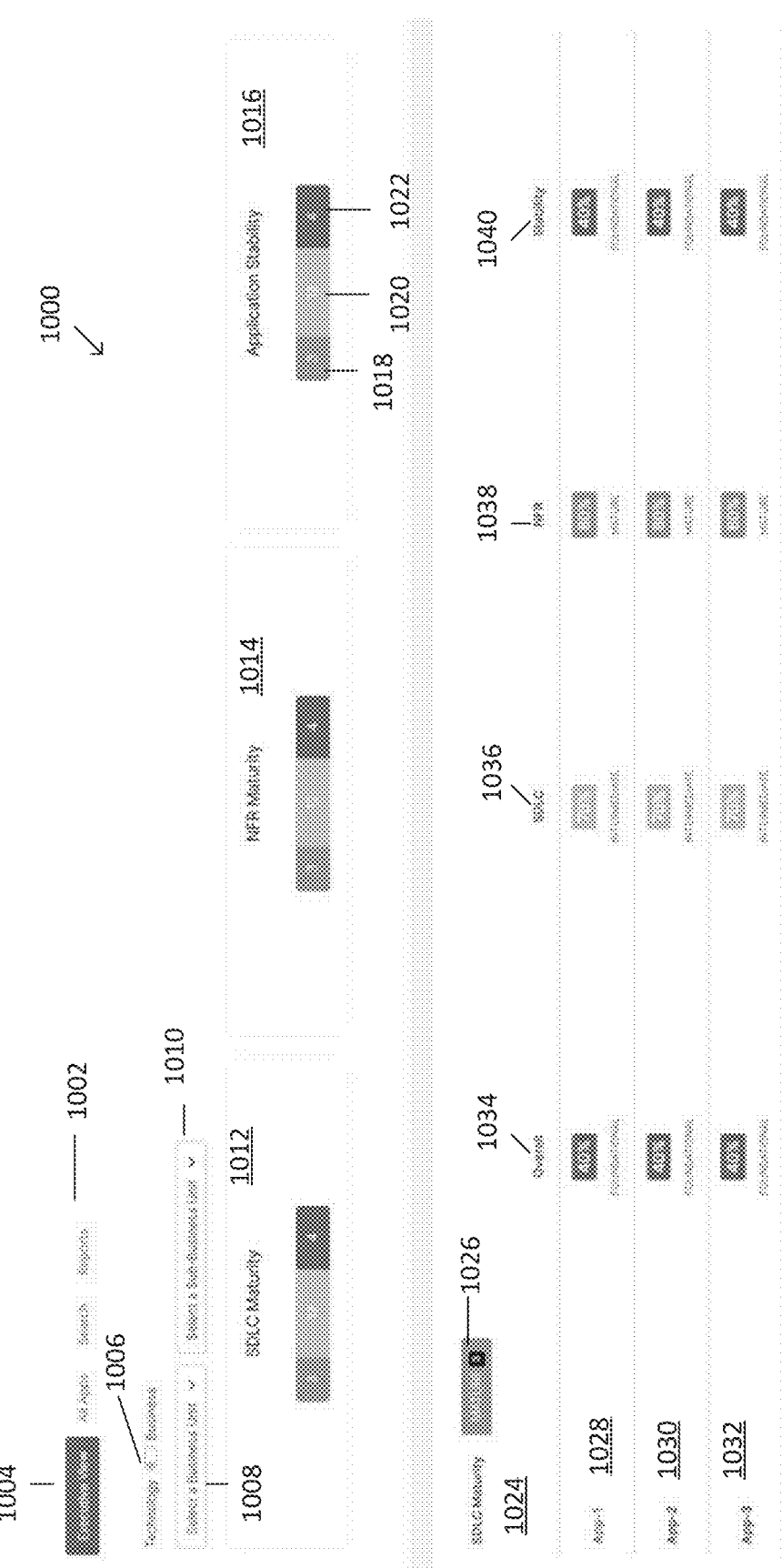
FIG. 10 depicts an illustrative dashboard user interface for exemplary embodiments.

FIG. 10 depicts an illustrative dashboard 1000 that may be displayed to user 900. The dashboard 1000 may include a menu 1002 where the user may select a menu option 1004 to view the executive view of fitness metric for applications. The user may select the scope of the applications for which fitness information is displayed on the dashboard 1000 by choosing an option in dropdown list 1008 or via another user interface element that allows the user to select a business unit. The user may further refine the scope of applications for which fitness information is displayed on the dashboard 1000 by choosing sub-business unit from dropdown list 1010. The dashboard may display summary information for the SDLC maturity 1012, the NFR maturity 1014, and the application stability 1016, for applications in the selected scope. The information provided includes a colored bar that indicates how many of the applications have overall scores in the specified fitness categories fall into the respective bins of mature, intermediate, and foundational. For instance, the overall application stability scores include 3 scores that are mature as indicated by bar segment 1018, 12 scores that are intermediate as indicated by bar segment 1020, and 4 scores that are foundational as indicated by bar segment 1022. Similar bar segments may be provided for the overall SDLC fitness maturity metric scores 1012 and the overall NFR fitness maturity metric scores 1014.

The user may drill down to get more detail regarding the fitness metric scores for the applications. For instance the user may select a bar segment to get more information. FIG. 19, shows an instance where the user has selected a segment of the bar for SDLC maturity. User interface element 1026 may be displayed responsive to the selection, and the user interface elements may indicate that 3 of the applications fell into the mature bin for overall SDLC fitness maturity metric scores. Section 1024 of the dashboard may display a list of applications and the scores for the applications in various fitness categories. FIG. 10 displays rows 1028, 1030, and 1032 for respective applications. Each row contains an indication of the fitness metric score for the application in the overall SLDC maturity category 1036. In this example, the three application each received a score of 70% of the threshold value, which places that score in the intermediate bin. Column 1038 displays information relating to the over-all NFR maturity fitness metric score for the applications. In the example, the NFR maturity metric scores were 80% of the threshold and binned in the mature bin. Column 1040 displays similar information for the overall application sta-bility fitness metric scores for the applications. Lastly, column 1034 displays similar information for the overall fitness metric scores for the applications.

As can be seen, the user interface, like the dashboard, is helpful to the user to understand the fitness levels of appli-cations. The user can review the overall fitness levels and the fitness levels in the fitness categories. Moreover, the user can determine how many applications are at the respective levels (i.e., bins) of fitness.

While exemplary embodiments have been described herein, various changes in form and detail may be made without departing from the intended scope of the claims appended hereto.

The invention claimed is:

1. A method performed by a processor of a computing device, comprising:

with the processor, ingesting information regarding fit-ness of applications that are available in an organiza-tion sources, including at least one of an application log, network monitoring software, or application moni-toring software;

with the processor, processing the ingested information regarding the fitness of the applications to transform the ingested information into fitness metric scores, com-prising:

generating application stability metric scores for each of selected ones of the applications, wherein the selected ones of the applications are applications for a business unit of a business entity, a division of a business entity, or a department of a business entity;

generating an overall application stability metric score for each of selected ones of the applications determined from the application stability metric scores for each of the selected ones of the applications generating software development life cycle (SDLC) met-ric scores for each of the selected ones of the applica-tions generating an overall SDLC metric score for each of the selected ones of the applications determined from the SDLC metric scores for each of selected ones of the applications generating non-functional requirements (NFR) metric scores for each of the selected ones of the applications, generating an overall NFR metric score for each of the selected ones of the applications determined from the NFR metric scores for each of selected ones of the applications;

generating an overall fitness metric score for each of the selected ones of the applications from the overall application stability metric scores, the overall SDLC metric scores, and the overall NFR metric scores for each of the selected ones of the applications;

storing the fitness metric scores in a database;

retrieving the overall application stability metric score, the overall SDLC metric score, the overall NFR metric score, and the overall fitness metric score for at least one of the selected ones of the applications from the database by calling application program interfaces;

displaying an indication of the retrieved overall applica-tion stability metric score, the retrieved overall SDLC metric score, the retrieved overall NFR metric score, and the retrieved overall fitness metric score for at least one of the selected ones of the applications as part of a user interface on a display device;

repairing and testing the applications where the fitness metric scores are below a predefined threshold; and re-deploying the applications where the fitness metric scores are above the predefined threshold.

2. The method of claim 1, further comprising binning at least some of the fitness metric scores into bins, wherein each bin is associated with a range of the fitness metric scores.

3. The method of claim 2, wherein each of the bins is associated with a degree of fitness.

4. The method of claim 1, further comprising displaying a user interface for specifying what applications are included in the selected ones of the applications.

5. A non-transitory computer-readable storage medium storing computer programming instructions for execution by a processor to cause the processor to:

ingest information regarding fitness of applications that are available in an organization sources including at least one of an application log, network monitoring software, or application monitoring software;

process the ingested information regarding the fitness of the applications to transform the ingested information into fitness metric scores, comprising:

generating application stability metric scores for each of selected ones of the applications, wherein the selected ones of the applications are applications for a business unit of a business entity, a division of a business entity, or a department of a business entity;

generating an overall application stability metric score for each of selected ones of the applications determined from the application stability metric scores for each of the selected ones of the applications, generating software development life cycle (SDLC) met-ric scores for each of the selected ones of the applica-tions;

generating an overall SDLC metric score for each of the selected ones of the applications determined from the SDLC metric scores for each of selected ones of the applications, generating non-functional requirements (NFR) metric scores for each of the selected ones of the applications;

generating an overall NFR metric score for each of the selected ones of the applications determined from the NFR metric scores for each of selected ones of the applications;

generating an overall fitness metric score for each of the selected ones of the applications from the overall application stability metric cores, the overall SDLC metric scores, and the overall NFR metric scores for each of the selected ones of the applications;

storing the fitness metric scores in a database;

retrieving the overall application stability metric score, the overall SDLC metric score, the overall NFR metric score, and the overall fitness metric score for at least one of the selected ones of the applications from the database by calling application program interfaces;

displaying an indication of the retrieved overall application stability metric score, the retrieved overall SDLC metric score, and the retrieved overall NFR metric score, and the retrieved overall fitness metric score for at least one of the selected ones of the applications as part of a user interface on a display device;

repairing and testing the applications where the fitness metric scores are below a predefined threshold; and re-deploying the applications where the fitness metric scores are above the predefined threshold.

6. The non-transitory computer-readable storage medium of claim 5, further storing computer programming instructions for execution by the processor to cause the processor to bin at least some of the fitness metric scores into bins, wherein each bin is associated with a range of the fitness metric scores.

7. The non-transitory computer-readable storage medium of claim 6, wherein each of the bins is associated with a degree of fitness.

8. The non-transitory computer-readable storage medium of claim 5, further storing computer programming instructions for execution by the processor to cause the processor to display a user interface for specifying what applications are included in the selected ones of the applications.

9. A computing device, comprising:

a non-transitory computer-readable storage medium storing computer programming instructions;

a processor configured to execute the computer programming instructions to cause the processor to:

ingest information regarding fitness of applications that are available in an organization, the sources including at least one of an application log, network monitoring software, or application monitoring software;

process the ingested information regarding the fitness of the applications to transform the ingested information into fitness metric scores, comprising:

generate application stability metric scores for each of selected ones of the applications, wherein the selected ones of the applications are applications for a business unit of a business entity, a division of a business entity, or a department of a business entity;

generate an overall application stability metric score for each of selected ones of the applications determined from the application stability metric scores for each of the selected ones of the applications, generate software development life cycle (SDLC) metric scores for each of the selected ones of the applications;

generate an overall SDLC metric score for each of the selected ones of the applications determined from the SDLC metric scores for each of selected ones of the applications, generate non-functional requirements (NFR) metric scores for each of the selected ones of the applications, generate an overall NFR metric score for each of the selected ones of the applications determined from the NFR metric scores for each of selected ones of the applications;

generate an overall fitness metric score for each of the selected ones of the applications from the overall application stability metric scores, the overall SDLC metric scores, and the overall NFR metric scores for each of the selected ones of the applications;

store the fitness metric scores in a database;

retrieve the overall application stability metric score, the overall SDLC metric score, the overall NFR metric score, and the overall fitness metric score for at least one of the selected ones of the applications from the database by calling application program interfaces;

display an indication of the overall application stability metric score, the overall SDLC metric score, the overall NFR metric score, and the overall fitness metric score for at least one of the selected ones of the applications as part of a user interface on a display device;

repair and test the applications where the fitness metric scores are below a predefined threshold; and re-deploy the applications where the fitness metric scores are above the predefined threshold.

10. The computing device of claim 9, wherein the computer programming instructions further cause the processor to bin the at least some of the fitness metric scores into bins, wherein each bin is associated with a range of the fitness metric scores.

11. The computing device of claim 10, wherein each of the bins is associated with a degree of fitness.

12. The computing device of claim 9, wherein the computer programming instructions further cause the processor to display a user interface for specifying what applications are included in the selected ones of the applications.

* * * * *